(12) United States Patent
Yang (10) Patent No.: US 11,611,713 B2
(45) Date of Patent: Mar. 21, 2023

(54) IMAGE CAPTURING SYSTEM

(71) Applicants: SINTAI OPTICAL (SHENZHEN) CO., LTD., Shenzhen (CN); ASIA OPTICAL CO., INC., Taichung (TW)

(72) Inventor: Fu-Yuan Yang, Taichung (TW)

(73) Assignees: SINTAI OPTICAL (SHENZHEN) CO., LTD., Shenzhen (CN); ASIA OPTICAL CO., INC., Taichung (TW)

(*) Notice: Subject to any disclaimer, the term of this patent is extended or adjusted under 35 U.S.C. 154(b) by 0 days.

(21) Appl. No.: 17/504,777

(22) Filed: Oct. 19, 2021

(65) Prior Publication Data

US 2022/0159195 A1    May 19, 2022

(30) Foreign Application Priority Data

Nov. 19, 2020    (CN) .......................... 202011298456.2

(51) Int. Cl.
| | | |
|---|---|---|
| *H04N 7/15* | (2006.01) | |
| *H04N 5/265* | (2006.01) | |
| *H04N 7/18* | (2006.01) | |
| *H04N 5/247* | (2006.01) | |
| *G06V 10/22* | (2022.01) | |

(52) U.S. Cl.
CPC .......... *H04N 5/265* (2013.01); *G06V 10/235* (2022.01); *H04N 5/247* (2013.01); *H04N 7/15* (2013.01); *H04N 7/181* (2013.01)

(58) Field of Classification Search
CPC .......... H04N 7/142; H04N 7/15; H04N 7/181; H04N 5/247; H04N 5/265; G06V 10/235; G08B 13/19617

USPC ............................................. 348/14.01–14.16
See application file for complete search history.

(56) References Cited

U.S. PATENT DOCUMENTS

| | | | | |
|---|---|---|---|---|
| 6,937,266 | B2* | 8/2005 | Rui ........................ | H04N 7/142 |
| | | | | 348/E7.083 |
| 7,852,369 | B2* | 12/2010 | Cutler ................ | H04N 5/23203 |
| | | | | 348/14.09 |
| 2009/0220065 | A1 | 9/2009 | Ahuja et al. | |
| 2010/0128105 | A1* | 5/2010 | Halavy .................. | H04N 7/147 |
| | | | | 348/14.05 |
| 2014/0184733 | A1* | 7/2014 | Liu ........................ | H04N 7/147 |
| | | | | 348/14.09 |

FOREIGN PATENT DOCUMENTS

TW    M594323 U    4/2020

* cited by examiner

*Primary Examiner* — Melur Ramakrishnaiah
(74) *Attorney, Agent, or Firm* — McClure, Qualey & Rodack, LLP (57) ABSTRACT

The present invention provides an image capturing system, which includes: a plurality of cameras, a plurality of microphones, an audio processing unit, a video processing unit, and a data processing device. The audio processing unit detects the orientation of the main audio source according to an audio signal received in a space by the microphones. The video processing unit stitches a plurality of images obtained by the cameras into a composite image. The data processing device detects a first object from the composite image according to the orientation of the main audio source.

20 Claims, 4 Drawing Sheets

IMAGE CAPTURING SYSTEM

CROSS REFERENCE TO RELATED APPLICATIONS

The present application is based on, and claims priority from, China Application Serial Number 202011298456.2, filed on Nov. 19, 2020, the disclosure of which is hereby incorporated by reference herein in its entirety.

BACKGROUND OF THE INVENTION

Field of the Invention

The present invention relates to an image capturing system.

Description of the Related Art

In traditional video conferences, the resolution of the cameras that are used is usually not high, or the cameras may not be equipped with ultra-wide-angle lenses. In this case, if the video conference is held in a small conference room, everyone must crowd around the camera to participate in the conference, which makes the conference seem to be very crowded.

Therefore, the present invention provides an image capturing system to improve the problems faced in the prior art.

BRIEF SUMMARY OF THE INVENTION

The image capturing system according to the present invention comprises: a plurality of cameras; a plurality of microphones, an audio processing unit, a video processing unit, and a data processing device. The audio processing unit detects the orientation of the main audio source according to an audio signal received in a space by the microphones. The video processing unit stitches a plurality of images obtained by the cameras into a composite image. The data processing device detects a first object from the composite image according to the orientation of the main audio source.

In some embodiments, the image capturing system further comprises a connection interface unit, connected to an output device, to transmit the composite image and the audio signal of the main audio source to the video platform via the output device.

In some embodiments, the connection interface unit transmits a first image comprising the first object to the video platform via the output device.

In some embodiments, the data processing device traces the first object detected from the composite image.

In some embodiments, the connection interface unit transmits a first tracing image taken when tracing the first object to the video platform via the output device.

In some embodiments, the data processing device detects a second object from a region of interest (ROI) according to the region of interest selected by the user; and the connection interface unit transmits a second tracing image comprising the second object to the video platform via the output device.

In some embodiments, the data processing device traces the second object detected from the region of interest.

In some embodiments, the connection interface unit transmits a second tracing image taken when tracing the second object to the video platform via the output device.

In some embodiments, the data processing device is arranged in the output device.

In some embodiments, the cameras are circularly arranged on the body of the image capturing system; and the microphones are circularly arranged on the body, and are arranged alternately with the cameras.

The image capturing system according to the present invention can provide the composite image to the video platform for viewing by the participants. Therefore, users of the small conference room can participant in the conference without being crowded in front of the camera. Next, the present invention first detects the orientation of the main audio source, and then identifies and traces the speaker (the first object) in a specific area of the orientation, so there is no need to identify the entire screen of the composite image. Therefore, the effect of saving system resources can be achieved. In addition, the user can also directly select the region of interest from the composite image, and then the image capturing system identifies and traces a specific person or an object (the second object) according to the region of interest selected by the user. Therefore, the more interaction can be brought to the users of the video conference.

DETAILED DESCRIPTION OF THE INVENTION

Figure 1A:
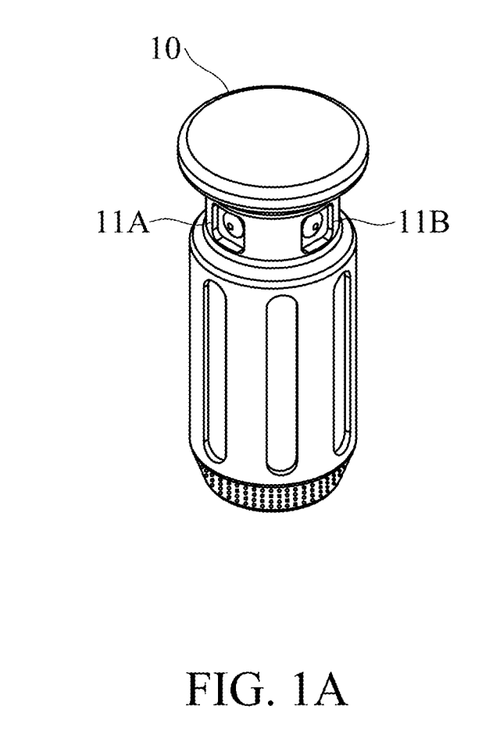
FIG. 1A is a schematic diagram of the image capturing system 1 according to one embodiment of the present invention.

FIG. 1A is a schematic diagram of the image capturing system 1 according to one embodiment of the present invention. As shown in FIG. 1A, the image capturing system 1 comprises a body 10, and the body 10 can be arranged upright on a table. In addition, a plurality of cameras can be arranged on the side wall of the body 10, to receive a plurality of images; and a plurality of microphones can be arranges on the side wall of the body 10, to receive audio signals. In addition, FIG. 1A only shows that the body 10 comprises two cameras 11A and 11B from one of the viewing angles, the arrangement of cameras and microphones can also be understood through FIG. 1B described as follows. In addition, the shape and color of the body 10 can also be adjusted arbitrarily.

Figure 1B:
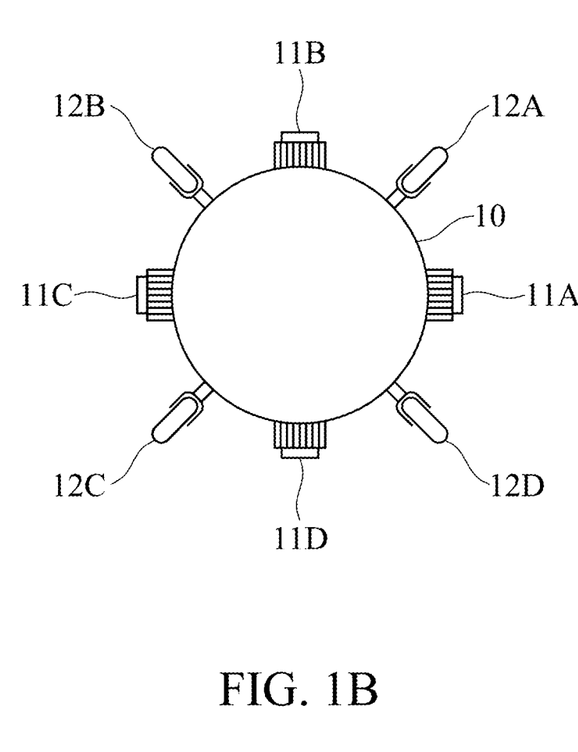
FIG. 1B is a top view of the image capturing system 1 according to one embodiment of the present invention.

FIG. 1B is a top view of the image capturing system 1 according to one embodiment of the present invention. As shown in FIG. 1B, the image capturing system 1 comprises: a body 10, four cameras 11A~11D and four microphones 12A~12D. Four cameras 11A~11D are circularly arranged on the body 10; in addition, four microphones 12A~12D are also circularly arranged on the body 10, and are arranged alternately with four cameras 11A~11D.

For example, four cameras 11A~11D can be wide-angle lens with a viewing angle of 120 degrees. Taking FIG. 1B for example, if the center of the body 10 is taken as the origin, the orientation toward the camera 11A is 0 degrees, and the counterclockwise orientation is the positive orientation, then the camera 11A can shoot images or videos at an angle of 300~60 degrees. The camera 11B can shoot images or videos at an angle of 30~150 degrees; the camera 11C can shoot images or videos at an angle of 120~240 degrees; the camera 11D can shoot images or videos at an angle of 210~330 degrees. It should be further explained that although four cameras 11A~11D are used as an example in this embodiment, the present invention is not limited to this embodiment. In order to provide a wider or clearer image, the present invention can further set more than four cameras or less than four cameras. Take two cameras for example: each camera can be a wide-angle lens with a viewing angle of more than 90 degrees, one camera can shoot images or videos at an angle of 0~90 degrees, and the other camera can shoot images or videos at an angle of 90~180 degrees. Alternatively, one camera can shoot images or videos at an angle of 0~180 degrees, and the other camera can shoot images or videos at an angle of 180~360 degrees.

Figure 1C:
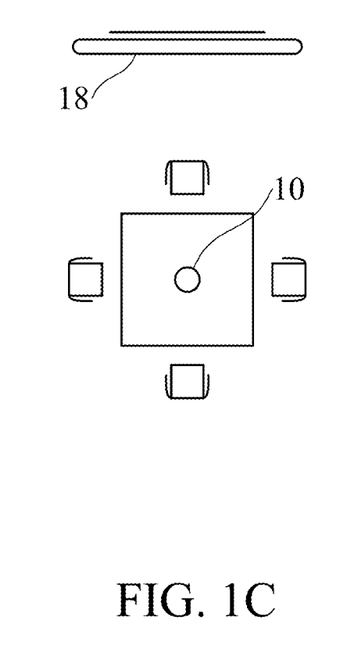
FIG. 1C is a schematic diagram of actually arranging the image capturing system 1 in the conference room according to one embodiment of the present invention.

Next, FIG. 1C is a schematic diagram of actually arranging the image capturing system 1 in the conference room according to one embodiment of the present invention. As shown in FIG. 1C, the user participating in the conference can arrange the body 10 in the center of the table in the conference room. In this way, when four users sit in the seats of the conference room, four cameras 11A~11D can shoot images or videos of four users. In addition, an output device 18 is also arranged in the conference room, the output device 18 can display the screen displayed by the video platform for the convenience of four users to watch.

In addition, although in the embodiment shown in FIG. 1A~1C, the number of cameras and microphones is four, the number is only for convenience to describe, and is not limited to this in other embodiments.

Figure 2:
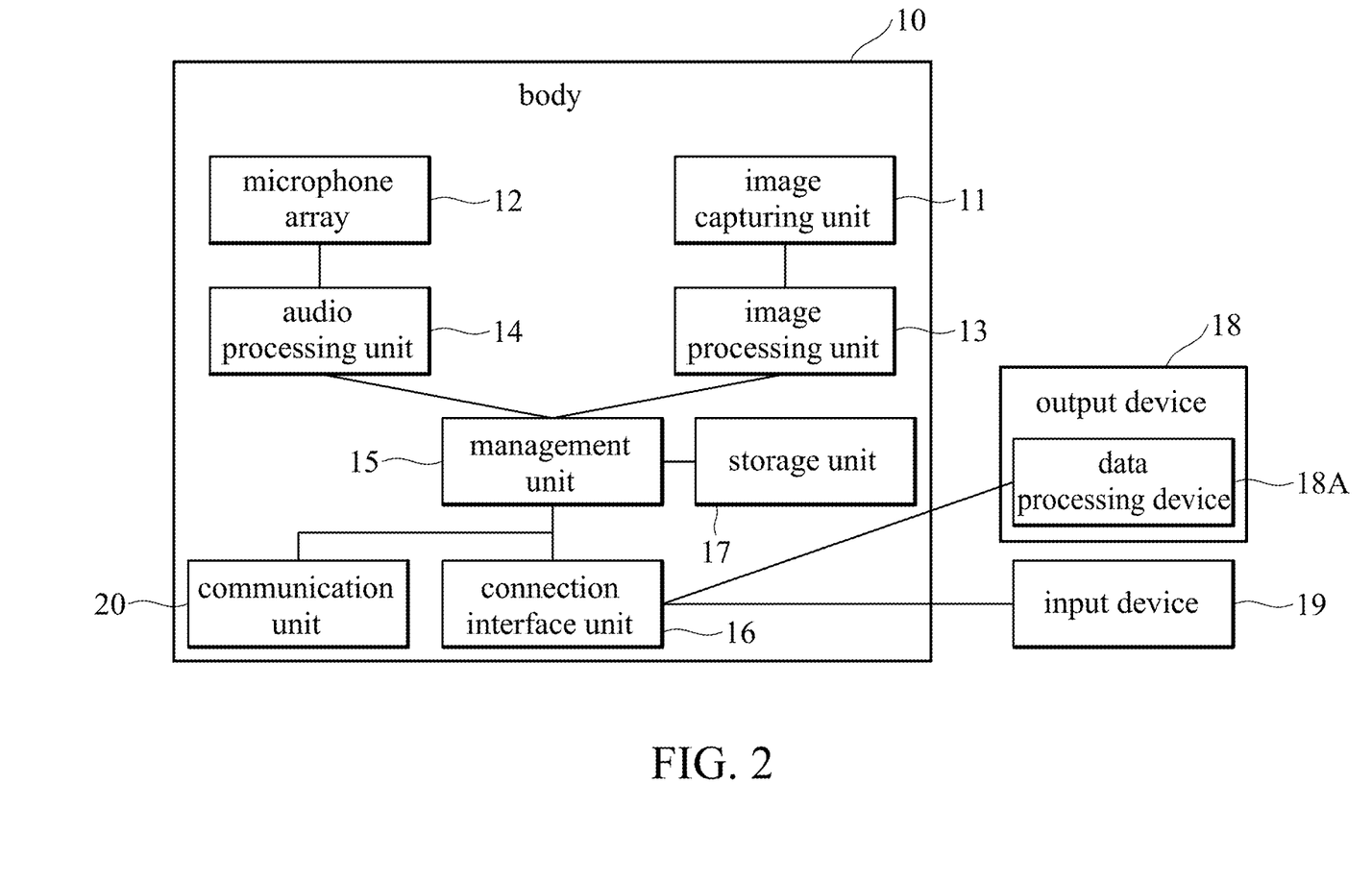
FIG. 2 is a circuit block diagram of the image capturing system 1 according to one embodiment of the present invention.

FIG. 2 is a circuit block diagram of the image capturing system 1 according to one embodiment of the present invention. As shown in FIG. 2, the body 10 comprises: an image capturing unit 11, a microphone array 12, an image processing unit 13, an audio processing unit 14, a management unit 15, a connection interface unit 16, a storage unit 17 and a communication unit 20. The audio processing unit 14 is connected to the microphone array 12. The image processing unit 13 is connected to the image capturing unit 11. The management unit 15 is connected to the image processing unit 13, the audio processing unit 14, the connection interface unit 16, the storage unit 17 and the communication unit 20.

In this embodiment, the image capturing unit 11 comprises four cameras 11A~11D shown in FIG. 1B. The image capturing unit 11 transmits the image captured by four cameras 11A~11D to the image processing unit 13.

The microphone array 12 comprises four microphones 12A~12D shown in FIG. 1B. The microphone array 12 converts the sound received by four microphones 12A~12D to the audio signal and transmits to the audio processing unit 14.

The image processing unit 13 is a circuit unit which can perform image processing operation (for example, image composition) on images captured by four respective cameras 11A~11D of the image capturing unit 11.

The audio processing unit 14 is a circuit unit/chip which can calculate the detecting information of the sound according to sound signals received by four respective microphones 12A~12D of the microphone array 12. For example, the detecting information can be an orientation of the sound, an area of the sound, a position of the sound, or coordinates of the sound.

The management unit 15 is a hardware (such as a chip set or a processor) having computing capabilities, and is used to control the function of other units and manage the entire operation of the body 10. In this embodiment, for example, the management unit 15 is a single-core or multi-core central processing unit (CPU), graphic processing unit (GPU), microprocessor, or any other programmable microprocessor, digital signal processor (DSP), programmable controller, application specific integrated circuit (ASIC), programmable logic device (PLD), and the like.

For example, the connection interface unit 16 is a circuit unit which matches the following standard: serial advanced technology attachment (SATA) standard, parallel advanced technology attachment (PATA) standard, institute of electrical and electronic engineers (IEEE) 1934 standard, peripheral component interconnect express (PCI Express) interface standard, universal serial bus (USB) standard, ultra high speed-I (UHS-I) interface standard, ultra high speed-II (UHS-II) interface standard, Secure Digital (SD) interface standard, memory stick (MS) interface standard, multimedia card (MMC) interface standard, compact flash (CF) interface standard, integrated device electronics (IDE) interface standard, personal computer memory card international association (PCMCIA) standard, video graphics array (VGA) standard, digital visual interface (DVI) standard, high-definition multimedia interface (HDMI) standard, or other appropriate standards. In this embodiment, the management unit 15 can connect to the connection interface unit 16 such to connect to the output device 18 (for example, speaker, monitor, projector, desktop computer, laptop, tablet, server, and smartphone), so as to output the data (for example, the image generated by the body 10). In addition, the management unit 15 can connect to the connection interface unit 16 such to connect to the input device 19, so as to receive the input signal from the input device 19, or receive the operation of the user (for example, the participant).

The storage unit 17 can temporarily store the data through the instruction from the management unit 15. The data comprises the data for managing the body 10, the data received from other electronic devices, the data for transmitting to other electronic devices, or any kinds of data, the present invention is not limited to this.

It should be noted that the output device 18 and the input device 19 can also be integrated into one electronic device (for example, the touch screen). In particular, the connection interface unit 16 can also connect to other storage unit (for example, the memory card, the external hard disk drive), such that the management unit 15 can access the data stored in the storage unit connected via the connection interface unit 16. In addition, in another embodiment, the different input device and output device connected via the connection interface unit 16 can also be integrated into the body 10.

In one embodiment, the body 10 can connect to other electronic devices (for example, desktop computer, laptop, tablet, server, and smartphone, etc.) via the connection interface unit 16, to make other electronic devices hold the video conference through the body 10 and the application such as the video platform like Skype, zoom, VooV Meeting, Webex, LINE, WeChat, V-CUBE, or Google meet etc., installed in other electronic devices. Therefore, the connection interface unit 16 can plug-and-play connects to the output device 18 through the USB video class (UVC) protocol, so as to transmit the 360-degree panoramic image and the audio signal of the main audio source to the video platform via the wired network or the wireless network.

In another embodiment, the body 10 further comprises a communication unit 20 connected to the management unit 15. The communication unit 20 transmits or receives the data through wireless communication. In this embodiment, the communication unit 20 can comprises a wireless communication module, and supports any one or the combination of the following communication technology: the global system for mobile (GSM) communication system, the personal handy-phone system (PHS), the code division multiple access (CDMA) system, the wireless fidelity (WiFi) system, the worldwide interoperability for microwave access (WiMAX) system, the third generation of wireless mobile telecommunications technology (3G), the fourth generation of wireless mobile telecommunications technology (4G), the long term evolution (LTE) technology, the infrared transmission, the Bluetooth (BT) communication technology, and is not limited to this. In addition, the communication unit 20 can also comprise a network interface card (NIC) to establish the network connection, such that the body 10 can connect to the local area network (LAN) or the Internet, When the body 10 is arranged in a closed space such as a conference room, the audio processing unit 14 can detect the orientation of the main audio source according to the audio signal received in the conference by four microphones 12A~12D. For example, the audio processing unit 14 can determine the detecting information of the main audio source according to the amplitude of the audio signal received by four microphones 12A~12D in a period of time. For example, the detecting information of the main audio source can be the orientation of the main audio source, the area of the main audio source, the position of the main audio source, or coordinates of the main audio source. In the following description, the case that the audio processing unit 14 determines the orientation of the main audio source according to the amplitude of the audio signal received by four microphones 12A~12D in a period of time will be taken as one embodiment of the present invention.

For example, when the amplitude of the audio signal received by the microphone 12A arranged at an angle of 45 degrees, is several times the amplitude of the same audio signal received by the microphone 12B arranged at an angle of 135 degrees, for example, twice, then the audio processing unit 14 can determine that the audio signal is closer to the microphone 12A than to the microphone 12B.

The method for the audio processing unit 14 to determine the orientation of the main audio source as mentioned above is mainly implemented by using sound localization technology. There are many ways to implement the conventional sound localization algorithm. Here, one method of sound localization for the audio signal received by four microphones 12A~12D of the present invention will be briefly described.

In one embodiment, sound localization comprises at least the following steps: (i) receiving the audio signal by microphones 12A~12D, (ii) the analog/digital converter, (iii) audio input selection, (iv) calculating the time difference of arrival (TDOA) and (v) time difference of arrival (TDOA) angle conversion. Each steps will be described conceptually.

Since all the signals in nature, comprising the sounds we can here, are analog signals. Therefore, after the microphones 12A~12D receive the audio signals, an analog/digital converter is needed to convert the analog signal into the digital signal, so that the audio processing unit 14 can perform the following process.

Next, after the analog/digital converter converts the analog signal into the digital signal, the audio processing unit 14 starts to determine whether the received digital signal needs to be processed or not. This process is called "audio input selection". Specifically, the audio input selection can be further divided into the following three steps, which called: "threshold value detection" (TVD), "zero crossing rate" (ZCR) and "end point detection" (EPD).

The "threshold value detection" (TVD) is used to determine whether the amplitude of the input digital signal is greater than a threshold value. If the amplitude is greater than a threshold value, then the input digital signal will be regarded as a human sound and to be processed; otherwise, the input digital signal will be regarded as a noise and will not to be processed.

The "zero cross rate" (ZCR) is used for compensating the deficiency of threshold value detection, and its main spirit is to determine whether the digital signal is a noise or not more precisely. Generally speaking, when we estimate the number of times the digital signal crosses the zero line, the noise usually does so more times. Therefore, the audio processing unit 14 can further filter the noise that has not been excluded during the threshold value detection step by calculating the "zero cross rate".

The "end point detection" (EPD) is used to determine whether the digital signal has ended. Specifically, the end point detection also needs another threshold value to determine whether the amplitude of the input digital signal is less than the threshold value, so as to determine whether a certain segment of the digital signal has ended, and to decide the timing when the next segment of the digital signal starts. After the above steps, the audio processing unit 14 can determine which digital signals need to be processed.

After the audio input selection is finished, the audio processing unit 14 will calculate the time difference of arrival (TDOA) of a plurality of digital signals that need to be processed. Specifically, the purpose of calculating the time difference of arrival is to calculate the time interval between a plurality of digital signals. In the prior art, we can also use the formula of average magnitude difference function (AMDF) to calculate the time interval between a plurality of digital signals. The concept is: when the smallest s value is obtained by using average magnitude difference function to a plurality of digital signals, it means that the shortest time interval between a plurality of digital signals is the time of s sampling points.

Finally, the audio processing unit 14 will calculate the orientation (the angle) of the main audio source according to the following conditions such as the s value, the sampling rate, the speed of sound, and the relative distances between the microphones 12A~12D. This process is called "time difference of arrival angle conversion".

In addition, the audio processing unit 14 can also perform post-processing on the received audio signal, such as echo cancelation, noise reduction . . . and other processing. Since sound localization, echo cancelation and noise reduction are well-known processes in this technical field, the detailed descriptions of these processes are omitted here.

Finally, the audio processing unit 14 can determine the orientation of the main audio source based on the result of the above processes and the result of the post-processing. In this embodiment, we assume that the audio processing unit 14 detects the orientation of the main audio source is 75 degrees.

Next, when the body 10 is arranged in a closed space such as a conference room, the image processing unit 13 stitches a plurality of images received by four cameras 11A~11D into one 360-degree panoramic image. The "image stitching" is a technology of stitching two or more overlapping images into a panoramic image or a high-resolution image.

According to the embodiment in FIG. 1A~1C, in a closed space, any angle from 0 degrees to 360 degrees with the body 10 as the axis can be shot by at least one of the cameras 11A~11D, and therefore, the image processing unit 13 can stitch four images received by four cameras 11A~11D into one 360-degree panoramic image.

Specifically, there are two major steps when performing image stitching: image alignment and image blending. Image alignment is to find out the conversion relationship between two images, so that the two converted images have the same part to overlap; image blending is to eliminate the obvious boundary between two converted images, so that the two images can be stitched smoothly.

Algorithms commonly used for image alignment comprises feature point detection, such as scale-invariant feature transform (SIFT) algorithm; and image registration, such as random sample consensus (RANSAC) algorithm, etc. In addition, algorithms commonly used for image blending comprises alpha blending or gradient-domain stitching, etc. Since the above algorithms are also well-known algorithms in this technical field, the detailed descriptions of these algorithms are omitted here.

The image processing unit 13 can stitch the images of the conference room into a 360-degree panoramic image using the algorithms mentioned above. For example, the 360-degree panoramic image after stitching can be the 360-degree panoramic image in FIG. 3 as described later. In the 360-degree panoramic image, each coordinate of the horizontal axis corresponds to an angle from 0 degrees to 360 degrees. In addition, the height of the vertical axis depends on the shooting elevation angles of four cameras 11A~11D. In the embodiment of the present invention, the shooting elevation angles can be 0 degrees to 60 degrees, or they can be other angles. The range of the shooting elevation angles depends on the physical structure of the cameras 11A~11D.

The output device 18 in FIG. 2 further comprises a data processing device 18A. The data processing device 18A can detect a first object from the 360-degree panoramic image according to the orientation of the main audio source.

Specifically, as in the previous description, we have assumed that the audio processing unit 14 detects that the orientation of the main audio source in the conference is 75 degrees. Therefore, the audio processing unit 14 can extend the range of a certain angle to the left and right from 75 degrees as the center, for example, 45 degrees, and detect whether there is a first object in the range of 30 degrees to 120 degrees in the 360-degree panoramic image. In a conference, the main sound source is usually the voice of the speaker. Therefore, the data processing device 18A can regard the first object detected within the range of 30 degrees to 120 degrees as the speaker of the conference. In this embodiment, the speaker is the person C in FIG. 3.

In other words, in one embodiment of the present invention, firstly, the audio processing unit 14 detects the orientation of the main audio source in the conference; then the data processing device 18A detects whether the first object exists in a certain range from the 360-degree panoramic image according to the orientation of the main audio source. Therefore, the data processing device 18A doesn't need to perform object detection on the overall image of the 360-degree panoramic image, and can achieve the effect of saving system resources. In addition, if no one is speaking in the conference, that is, if four microphones 12A~12D do not receive obvious audio signals (for example, the audio signals received by each microphone 12A~12D do not exceed a threshold value), then the data processing device 18A will not detect whether the first object exists in the 360-degree panoramic image. Therefore, the data processing device 18A can achieve the effect of saving system resources.

Figure 3:
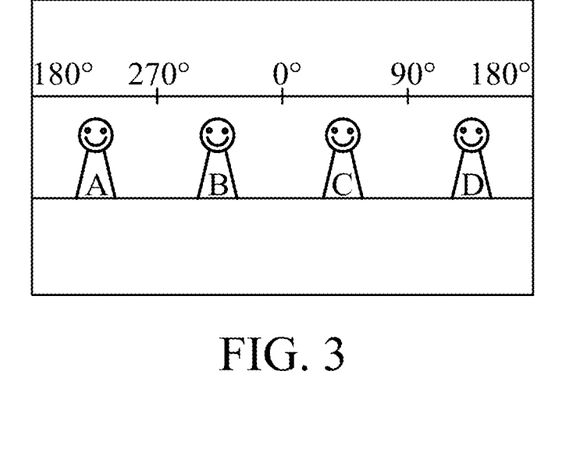
FIG. 3 is a schematic diagram of displaying a 360-degree panoramic image on a video platform according to one embodiment of the present invention.

FIG. 3 is a schematic diagram of displaying a 360-degree panoramic image on a video platform according to one embodiment of the present invention. As mentioned above, the connection interface unit 16 can connect to the output device 18, to transmit the 360-degree panoramic image to the video platform. When the user attends the conference through the video platform, the video platform can display the 360-degree panoramic image of the conference.

In addition, as shown in FIG. 3, the video platform can also selectively display the angle corresponding to each orientation in the 360-degree panoramic image. The angle value can be displayed in multiples of 90 degrees, such as 0 degrees, 90 degrees, 180 degrees, and 270 degrees as illustrated in FIG. 3; the angle value can also be displayed in multiples of 45 degrees, but it is not limited to this.

Figure 4:
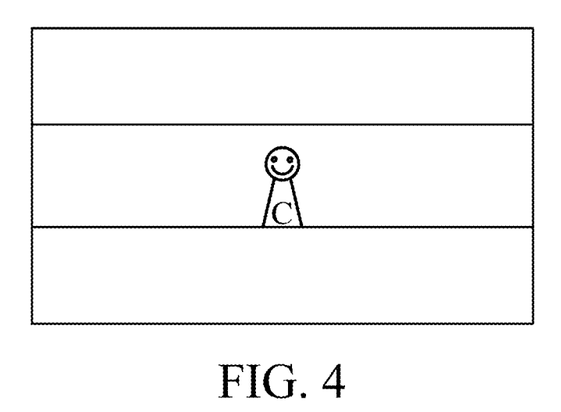
FIG. 4 is a schematic diagram of displaying a first image on a video platform according to one embodiment of the present invention.

In addition, after the data processing device 18A detects the first object, the data processing device 18A can also transmit a first image comprising the first object to the video platform. FIG. 4 is a schematic diagram of displaying a first image on a video platform according to one embodiment of the present invention. Since the data processing device 18A has detected the first object (i.e. the person C) in the range of 30 degrees to 120 degrees from the 360-degree panoramic image, in FIG. 4, the video platform can display the first image comprising the first object (the person C).

Figure 5:
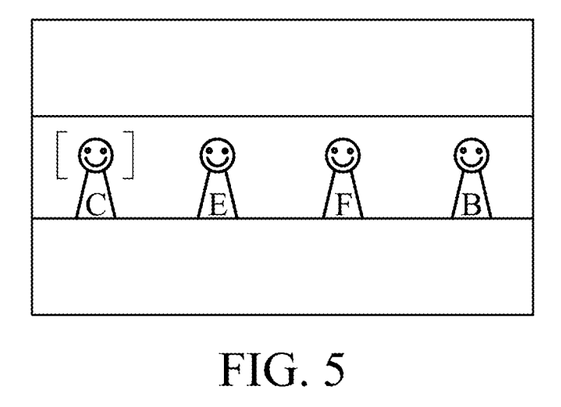
FIG. 5 is a schematic diagram of displaying a first tracing image on a video platform according to one embodiment of the present invention.

In addition, after the data processing device 18A detects the first object, the data processing device 18A can also trace the first object (the person C). FIG. 5 is a schematic diagram of displaying a first tracing image on a video platform according to one embodiment of the present invention.

Specifically, after the data processing device 18A detects the first object, the data processing device 18A can recognize the position of the first object in different conference scenes according to the features of the first object (the person C) such as the facial contour, the body shape, the hairstyle, etc., so that the object recognition will not be affected by various factors such as the coverage on the face (for example, the mask, the sunglasses, the hat, the beards, etc.,) or age. Specifically, there are four people B, C, E, and F in the conference scene in FIG. 5. The data processing device 18A can frame the face of the person C in the conference scene in FIG. 5 with a black bold [ ]. In this way, users who use the video platform to participate in the conference can quickly find out the position of the person C different conference scenes.

In addition, after the data processing device 18A detects that the first object is the person C, in different conference scenes, the data processing device 18A can also zoom the first tracing image. In other words, the data processing device 18A can zoom in the first tracing image, to highlight the outline of the person C; the data processing device 18A can zoom out the first tracing image, to illustrate the relative position between the person C and the other people and the background.

In addition, in the embodiment, the data processing device 18A frame the first object (the person C) with a black bold [ ], but the data processing device 18A can also frame the first object (the person C) with other identifiers such as the block or the triangle, and the color of [ ] or other identifiers can also be selected arbitrarily.

In addition, in the embodiment shown in FIG. 3~5, the 360-degree panoramic image (FIG. 3), the first image (FIG. 4) and the first tracing image (FIG. 5) are displayed separately on the video platform, but the embodiment of the present invention is not limited to this. For example, the video platform can display the 360-degree panoramic image of FIG. 3 and the first image of FIG. 4 at the same time. In addition, the video platform can display the 360-degree panoramic image of FIG. 3 and the first tracing image of FIG. 5 at the same time. In addition, the video platform can display the first image of FIG. 4 and the first tracing image of FIG. 5 at the same time. In addition, the video platform can display the 360-degree panoramic image of FIG. 3, the first image of FIG. 4 and the first tracing image of FIG. 5 at the same time. When the video platform displays a plurality of images at the same time, the screen can also be divided equally by up and down, or left and right, or picture-in-picture, and the embodiment is not limited to this.

It should be noted that algorithms of human detection and human tracing mentioned above can all be implemented by using the conventional feature recognition algorithms. For example, algorithms based on facial feature points can be used, and algorithms based on neural network can also be used. Therefore, detailed descriptions of these algorithms are omitted here.

As mentioned above, in the embodiment shown in FIG. 3~5, the data processing device 18A detects the first object (the person C) from the 360-degree panoramic image according to the main orientation detected by the audio processing unit 14. The connection interface unit 16 transmits the 360-degree panoramic image (FIG. 3), the first image (FIG. 4) and the first tracing image (FIG. 5) to the video platform via the output device 18. Next, in the embodiment shown in FIG. 6~8, the data processing device 18A detects the second object from the region of interest (ROI) (FIG. 6) according to the region of interest selected by the user. The connection interface unit 16 transmits the second image comprising the second object (FIG. 7) and the second tracing image shot while tracing the second object (FIG. 8) to the video platform via the output device 18.

Figure 6:
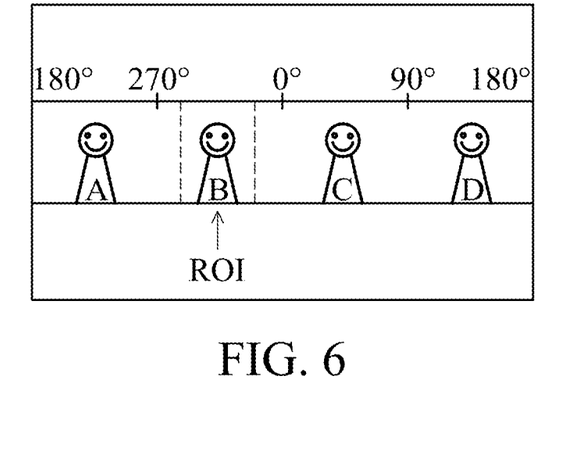
FIG. 6 is a schematic diagram of the region of interest (ROI) selected by the user according to one embodiment of the present invention.

FIG. 6 is a schematic diagram of the region of interest (ROI) selected by the user according to one embodiment of the present invention. The 360-degree panoramic image in FIG. 6 is the same as the 360-degree panoramic image in FIG. 3. However, in the embodiment shown in FIG. 6, the data processing device 18A can accept the user to select the region of interest (shown by the area between two dotted line) of any aspect ratio. After the user selects the region of interest, the data processing device 18A only detects whether the second object exists in the region of interest.

It should be noted here that the region of interest selected by the user is not limited to the image of people. For example, if it is necessary to explain the exhibits or semi-finished products of a certain project during the conference, so that the users participating in the conference can also watch it clearly, the region of interest selected by the user at this time, can also comprises objects such as exhibits, chairs, telephones and other objects excluding the people. However, for the convenience of the following description, we still take person B as an example here, which means that the region of interest selected by the user comprises the person B.

Figure 7:
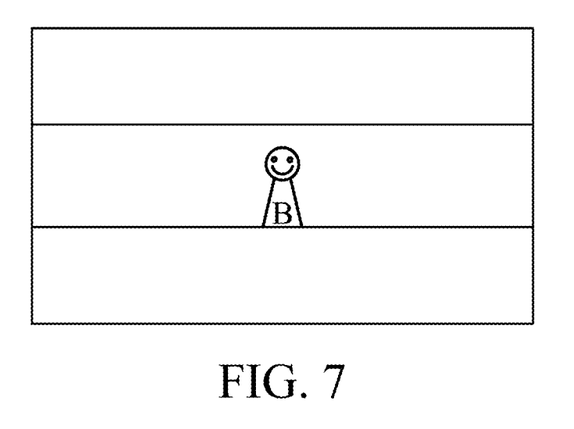
FIG. 7 is a schematic diagram of displaying a second image on a video platform according to one embodiment of the present invention.

FIG. 7 is a schematic diagram of displaying a second image on a video platform according to one embodiment of the present invention. In FIG. 7, since the data processing device 18A has detected the second object (i.e. the person B) in the region of interest from the 360-degree panoramic image, in FIG. 7, the video platform can display the second image comprising the second object (the person B).

Figure 8:
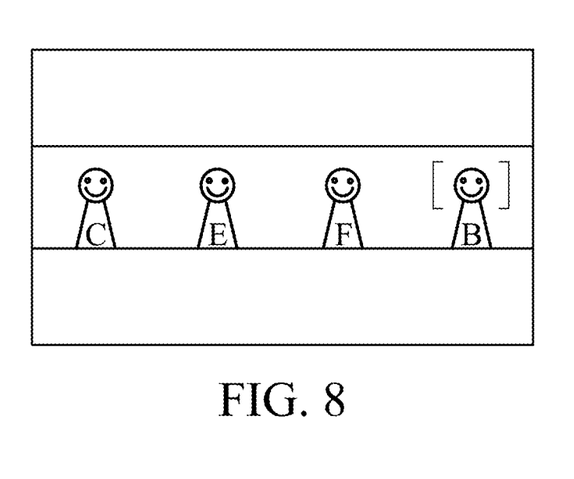
FIG. 8 is a schematic diagram of displaying a second tracing image on a video platform according to one embodiment of the present invention.

In addition, after the data processing device 18A detects the second object, the data processing device 18A can also trace the second object (the person B). FIG. 8 is a schematic diagram of displaying a second tracing image on a video platform according to one embodiment of the present invention. The conference scene in FIG. 8 is the same as the conference scene in FIG. 5. As shown in FIG. 8, there are four people B, C, E and F in the conference scene, which is the same as shown in FIG. 5. While in this embodiment, since the data processing device 18A has detected the second object, the data processing device 18A can frame the face of the person B in the conference scene in FIG. 8 with a black bold [ ]. The identifier and the color to frame the second object, is the same as the description in FIG. 5, can be selected arbitrarily, and the descriptions are omitted here.

In addition, in the embodiment shown in FIG. 6~8, the 360-degree panoramic image comprising the ROI (FIG. 6), the second image (FIG. 7) and the second tracing image (FIG. 8) are displayed separately on the video platform, but the embodiment of the present invention is not limited to this. For example, the video platform can display the 360-degree panoramic image of FIG. 6 and the second image of FIG. 7 at the same time. In addition, the video platform can display the 360-degree panoramic image of FIG. 6 and the second tracing image of FIG. 8 at the same time. In addition, the video platform can display the 360-degree panoramic image of FIG. 6, the second image of FIG. 7 and the second tracing image of FIG. 8 at the same time. When the video platform displays a plurality of images at the same time, the screen can also be divided equally by up and down, or left and right, or picture-in-picture, and the embodiment is not limited to this.

All the structures and functions of the image capturing system 1 of the present invention have been described in detail. However, the above text and illustrations are only illustrative descriptions, and are not used to limit the scope of the present invention. Therefore, the scope of the present invention should be subject to the following claims. In addition, without departing from the purpose and spirit of the present invention, the elements described in the circuit diagrams and the block diagrams can also be changed, added to, subtracted from, and combined appropriately.

What is claimed is:

1. An image capturing system, comprising:
a plurality of cameras;
a plurality of microphones;
an audio processing unit, detecting a detecting information of a main audio source according to an audio signal received in a space by the microphones;
a video processing unit, stitching a plurality of images obtained by the cameras into a composite image; and
a data processing device, firstly according to the detecting information of the main audio source, and secondly detecting a first object from the composite image;

wherein the data processing device detects whether the first object exists in a certain range from a 360-degree panoramic image according to the orientation of the main audio source.

2. The image capturing system as claimed in claim 1, wherein the detecting information of the main audio source is an orientation of the main audio source, an area of the main audio source, a position of the main audio source, or coordinates of the main audio source.

3. The image capturing system as claimed in claim 2, further comprising:
a connection interface unit, connected to an output device, to transmit the composite image and an audio signal of the main audio source to a video platform via the output device;
wherein the data processing device is arranged in the output device.

4. The image capturing system as claimed in claim 2, wherein the connection interface unit transmits a first tracing image or a second tracing image taken when tracing the first object or the second object to the video platform via the output device.

5. The image capturing system as claimed in claim 2, wherein the cameras are circularly arranged on a body of the image capturing system;
wherein the microphones are circularly arranged on the body, and are arranged alternately with the cameras.

6. The image capturing system as claimed in claim 2, wherein the data processing device detects a second object from a region of interest (ROI) according to the region of interest selected by a user;
wherein the data processing device traces the second object detected from the region of interest.

7. An image capturing system, comprising:
a plurality of cameras;
a plurality of microphones;
an audio processing unit, detecting a detecting information of a main audio source according to an audio signal received in a space by the microphones;
a video processing unit, stitching a plurality of images obtained by the cameras into a composite image;
a data processing device, detecting a first object from the composite image according to the detecting information of the main audio source; and
a video platform, selectively displaying the angle corresponding to each orientation in a 360-degree panoramic image;
wherein the data processing device detects a second object from a region of interest (ROI) according to the region of interest selected by a user;
wherein the data processing device traces the second object detected from the region of interest.

8. The image capturing system as claimed in claim 7, wherein the detecting information of the main audio source is an orientation of the main audio source, an area of the main audio source, a position of the main audio source, or coordinates of the main audio source;
wherein the connection interface unit transmits a second tracing image comprising the second object to the video platform via the output device.

9. The image capturing system as claimed in claim 8, wherein the data processing device detects a second object from a region of interest (ROI) according to the region of interest selected by a user;
wherein the data processing device traces the second object detected from the region of interest.

10. The image capturing system as claimed in claim 8, further comprising:
a connection interface unit, connected to an output device, to transmit the composite image and an audio signal of the main audio source to a video platform via the output device;
wherein the data processing device is arranged in the output device.

11. The image capturing system as claimed in claim 10, wherein the data processing device traces the first object detected from the composite image.

12. The image capturing system as claimed in claim 11, wherein the connection interface unit transmits a first tracing image taken when tracing the first object to the video platform via the output device.

13. The image capturing system as claimed in claim 11, wherein the data processing device detects a second object from a region of interest (ROI) according to the region of interest selected by a user;
wherein the data processing device traces the second object detected from the region of interest.

14. The image capturing system as claimed in claim 8, wherein the connection interface unit transmits a first tracing image or a second tracing image taken when tracing the first object or the second object to the video platform via the output device.

15. The image capturing system as claimed in claim 8, wherein the cameras are circularly arranged on a body of the image capturing system;
wherein the microphones are circularly arranged on the body, and are arranged alternately with the cameras.

16. An image capturing system, comprising:
a plurality of cameras;
a plurality of microphones;
an audio processing unit, detecting a detecting information of a main audio source according to an audio signal received in a space by the microphones;
a video processing unit, stitching a plurality of images obtained by the cameras into a composite image; and
a data processing device, detecting a first object from the composite image according to the detecting information of the main audio source;
wherein the cameras are circularly arranged on a body of the image capturing system;
wherein the microphones are circularly arranged on the body, and are arranged alternately with the cameras along a common circular path.

17. The image capturing system as claimed in claim 16, wherein the detecting information of the main audio source is an orientation of the main audio source, an area of the main audio source, a position of the main audio source, or coordinates of the main audio source.

18. The image capturing system as claimed in claim 17, further comprising:
a connection interface unit, connected to an output device, to transmit the composite image and an audio signal of the main audio source to a video platform via the output device;
wherein the data processing device is arranged in the output device.

19. The image capturing system as claimed in claim 17, wherein the connection interface unit transmits a first tracing image or a second tracing image taken when tracing the first object or the second object to the video platform via the output device.

20. The image capturing system as claimed in claim 17,
- wherein the data processing device detects a second object from a region of interest (ROI) according to the region of interest selected by a user;
- wherein the data processing device traces the second object detected from the region of interest.

* * * * *